United States Patent
Chen

(10) Patent No.: US 6,503,405 B1
(45) Date of Patent: *Jan. 7, 2003

(54) SURFACE TREATMENT WITH ZP PROCESS FOR GMR MEDIA

(75) Inventor: Ga-Lane Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/496,341

(22) Filed: Feb. 2, 2000

Related U.S. Application Data
(60) Provisional application No. 60/129,305, filed on Apr. 14, 1999.

(51) Int. Cl.$^7$ .................................................. G11B 3/00
(52) U.S. Cl. .............................. 216/22; 216/52; 216/53; 216/66; 216/88
(58) Field of Search .............................. 216/22, 52, 53, 216/66, 88, 89

(56) References Cited

U.S. PATENT DOCUMENTS

| | | | |
|---|---|---|---|
| 4,430,782 A | 2/1984 | Bornhorst et al. ............ 29/90 R |
| 5,202,810 A | 4/1993 | Nakamura et al. ............ 360/135 |
| 5,432,012 A | 7/1995 | Lal et al. ..................... 428/610 |
| 5,462,796 A | 10/1995 | Teng et al. ................... 428/336 |
| 5,510,158 A | * 4/1996 | Hiramoto et al. ............. 216/66 |
| 5,833,871 A | * 11/1998 | Matsushita et al. ......... 216/103 |
| 6,231,676 B1 | * 5/2001 | Rudd et al. .................... 134/1 |
| 6,242,324 B1 | * 6/2001 | Kub et al. ..................... 216/22 |
| 6,335,063 B1 | * 1/2002 | Chen et al. .................... 216/66 |

FOREIGN PATENT DOCUMENTS

JP 62109057 A * 5/1987 ............ G03G/5/00

* cited by examiner

Primary Examiner—Anita Alanko
(74) Attorney, Agent, or Firm—Morrison & Foerster LLP

(57) ABSTRACT

A non-magnetic substrate having a super-clean and defect-free smooth surface for ultra high-density GMR recording is produced by a surface treatment called a "ZP" process. The term "ZP" means zap cutting with photon ozone treatment of the cut surface. "Zap cutting" is a process for cutting asperity of the non-magnetic substrate's surface. The ZP process could be applied to the whole substrate or certain areas of the non-magnetic substrate. The non-magnetic substrate could be used for disk drives that use either a landing zone design or a load/unload mechanism. The resulting magnetic recording medium exhibits improved flying stability, glide performance, reliability, tribology and long term durability for providing zero glide hits.

15 Claims, 6 Drawing Sheets

SURFACE TREATMENT WITH ZP PROCESS FOR GMR MEDIA

RELATED APPLICATIONS

This application claims priority from Provisional Application Serial No. 60/129,305 filed Apr. 14, 1999, entitled "SURFACE TREATMENT WITH ZP PROCESS FOR GMR MEDIA," the entire disclosure of which is hereby incorporated herein by reference.

CROSS-REFERENCE TO RELATED APPLICATIONS

This application discloses subject matter related to subject matter disclosed in co-pending U.S. patent application Ser. No. 09/634,253, filed Aug. 7, 2000 now U.S. Pat. No. 6,333,664; Ser. No. 09/612,319, filed on Jul. 7, 2000; Ser. No. 09/433,377, filed on Nov. 3, 1999 now U.S. Pat. No. 6,268,073; Ser. No. 09/433,375, filed on Nov. 3, 1999 now U.S. Pat. No. 6,381,200; Serial No. 60/109,230, filed on Nov. 18, 1998; Ser. No. 09/433,378, filed on Nov. 3, 1999 now U.S. Pat. No. 6,324,131; and Ser. No. 09/421,393, filed on Oct. 20, 1999 now U.S. Pat. No. 6,335,063, incorporated herein by reference.

FIELD OF INVENTION

The present invention relates to the recording, storage and reading of magnetic data, particularly rotatable magnetic recording media, such as thin film magnetic disks having smooth surfaces for data zone. The invention has particular applicability to high density magnetic recording media exhibiting low noise and having improved flying stability, glide performance and head-media interface reliability for providing zero glide hits.

BACKGROUND

Magnetic disks and disk drives are conventionally employed for storing data in magnetizable form. Typically, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk.

Data are written onto and read from a rapidly rotating recording disk by means of a magnetic head transducer assembly that flies closely over the surface of the disk. It is considered desirable during reading and recording operations to maintain each transducer head as close to its associated recording surface as possible, i.e., to minimize the flying height of the head. This objective becomes particularly significant as the areal recording density increases. The areal density (Mbits/in$^2$) is the recording density per unit area and is equal to the track density (TPI) in terms of tracks per inch times the linear density (BPI) in terms of bits per inch.

The increasing demands for higher areal recording density impose increasingly greater demands on flying the head lower because the output voltage of a disk drive (or the readback signal of a reader head in disk drive) is proportional to 1/exp(HMS), where HMS is the space between the head and the media. Therefore, a smooth recording surface is preferred, as well as a smooth opposing surface of the associated transducer head, thereby permitting the head and the disk to be positioned in closer proximity with an attendant increase in predictability and consistent behavior of the air bearing supporting the head.

Most of the current magnetic disks are normally driven by the contact start stop (CSS) method, while many advanced disk drives, especially for lap top computers, are using the load/unload ramp design mechanism.

In the load/unload ramp design, the head is parked off the disk when the disk drive is not in use. This is conventionally done by the use of a load and unload ramp, wherein a load and unload tang of a head suspension assembly slides along, thereby moving the head between a position on the disk and a position parked off the disk.

In the CSS method, the head begins to slide against a landing zone of the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk landing zone. During reading and recording operations, the transducer head is maintained at a controlled distance from the recording surface, supported on a bearing of air as the disk rotates. The magnetic head unit is arranged such that the head can be freely moved in both the circumferential and radial directions of the disk in this floating state allowing data to be recorded on and retrieved from the surface of the disk at a desired position.

Upon terminating operation of the disk drive, the rotational speed of the disk decreases and the head begins to slide against the surface of the disk again and eventually stops in contact with and pressing against the disk. Thus, the transducer head contacts the recording surface whenever the disk is stationary, accelerated from a stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

A conventional recording medium is shown in FIG. 1. Even thought FIG. 1 shows sequential layers on one side of the non-magnetic substrate 10, it is conventional to sputter deposit sequential layers on both sides of the non-magnetic substrate.

Adverting to FIG. 1, a sub-seed layer 11 is deposited on substrate 10, e.g., a glass or glass-ceramic substrate. Subsequently, a seed layer 12 is deposited on the sub-seed layer 11. Then, an underlayer 13, is sputter deposited on the seed layer 12. An intermediate or flash layer 14 is then sputter deposited on underlayer 13. Magnetic layer 15 is then sputter deposited on the intermediate layer, e.g., CoCrPtTa. A protective covering overcoat 16 is then sputter deposited on the magnetic layer 15. A lubricant topcoat (not shown in FIG. 1 for illustrative convenience) is deposited on the protective covering overcoat 16.

A conventional apparatus for manufacturing magnetic recording media is schematically illustrated in FIG. 2. The disk substrates travel sequentially from the heater to a sub-seed layer deposition station and a sub-seed layer is formed on the disk substrates. Then, the disk substrates travel to a seed layer station for deposition of the seed layer, typically NiAl. Subsequent to the deposition of the sub-seed layer and the seed layer, the disk substrates are passed through the underlayer deposition station wherein the underlayer is deposited. The disk substrates are then passed through the flash layer deposition station wherein typically a Co-alloy layer is deposited. The disks are then passed to the magnetic layer deposition station and then to the protective carbon overcoat deposition station.

In recent years, considerable effort has been expended to achieve high areal recording density. Among the recognized significant factors affecting recording density are magnetic remanance (Mr), coercivity, coercivity squareness (S*), signal/noise ratio, and flying height, which is the distance at which a read/write head floats above the spinning disk. Prior approaches to achieve increased areal recording density for longitudinal recording involve the use of dual magnetic layers separated by a non-magnetic layer as in Teng et al., U.S. Pat. No. 5,462,796, and the use of a gradient magnetic layer interposed between two magnetic layers as in Lal et al., U.S. Pat. No. 5,432,012.

However, the goal of achieving a rigid disk magnetic recording medium having an areal recording density of about 100 Gb/in$^2$ has remained elusive. In particular, the requirement to further reduce the flying height of the head imposed by increasingly higher recording density and capacity renders the disk drive particularly vulnerable to head crash due to accidental glide hits of the head and media. To avoid glide hits, a smooth surface of data zone is desired.

Conventional techniques for producing a smooth surface on the disk include polishing and tape burnishing (buffing). See, for example, Nakamura et al., U.S. Pat. No. 5,202,810 and Bornhorst et al., U.S. Pat. No. 4,430,782. Typically, the polishing is done using a slurry and buffing is done after sputtering. However, these conventional techniques are attendant with numerous disadvantages. For example, it is extremely difficult to provide a clean and smooth surface due to debris formed by mechanical abrasions.

There exists a need for a magnetic recording medium having an areal recording density in excess of 10 Gb/in$^2$, such as in the 20 Gb/in$^2$ range, preferably up to 400 Gb/in$^2$, exhibiting high coercivity and coercivity squareness and a relatively low Mrt (magnetic remanance×thickness), which can be employed for hard disk drives using GMR (giant magneto resistance) heads. For a GMR media, there exists a need to reduce the fly height to below 1 microinch (25 nm) with zero glide hits.

Disk glide height test (glide hits, glide avalanche), head fly height, and recording performance (output voltage, half peak height PW50, signal-to-noise ratio SNR) are sensitive to the spacing between the head and media. Accordingly, there exists a need for a system capable of providing a smooth topography of the non-magnetic substrate of a magnetic disk, thereby providing zero glide hits to enhance the reliability, tribology and long term durability of the data storage device.

SUMMARY OF THE INVENTION

An object of the present invention is a magnetic recording medium comprising a non-magnetic substrate having a very smooth surface of data zone.

Another object of the invention is a method of preparing a smooth surface of a non-magnetic substrate to provide zero glide hits, enhanced head-media interface reliability, tribology and glide performance of the head.

Additional advantages and features of this invention will be set forth in part in the description that follows and in part will become apparent to those having ordinary skill in the art upon examination of the following description and from the knowledge gained by practicing the invention. The advantages of this invention may be realized and obtained and are particularly pointed out in the claims.

According to the present invention, the foregoing and other objects are achieved in part by a magnetic recording medium comprising: a non-magnetic substrate having wholly or partially a smooth surface; and a magnetic layer formed on the upper surface; wherein $R_{max}$, i.e., the smooth surface has a maximum difference in height between the highest and lowest points on the surface relative to a mean plane, is less than 10 nm, preferably less than 5 nm.

Another aspect of the invention is a method of manufacturing a magnetic recording medium, which method comprises surface treatment of a surface of a non-magnetic substrate by exposing the surface to a polishing means for cutting asperity of the surface, e.g., a moving tape.

Another aspect of the invention is a method of manufacturing a magnetic recording medium, which method comprises surface treatment of a surface of a non-magnetic substrate by exposing the surface to photon ozone treatment.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
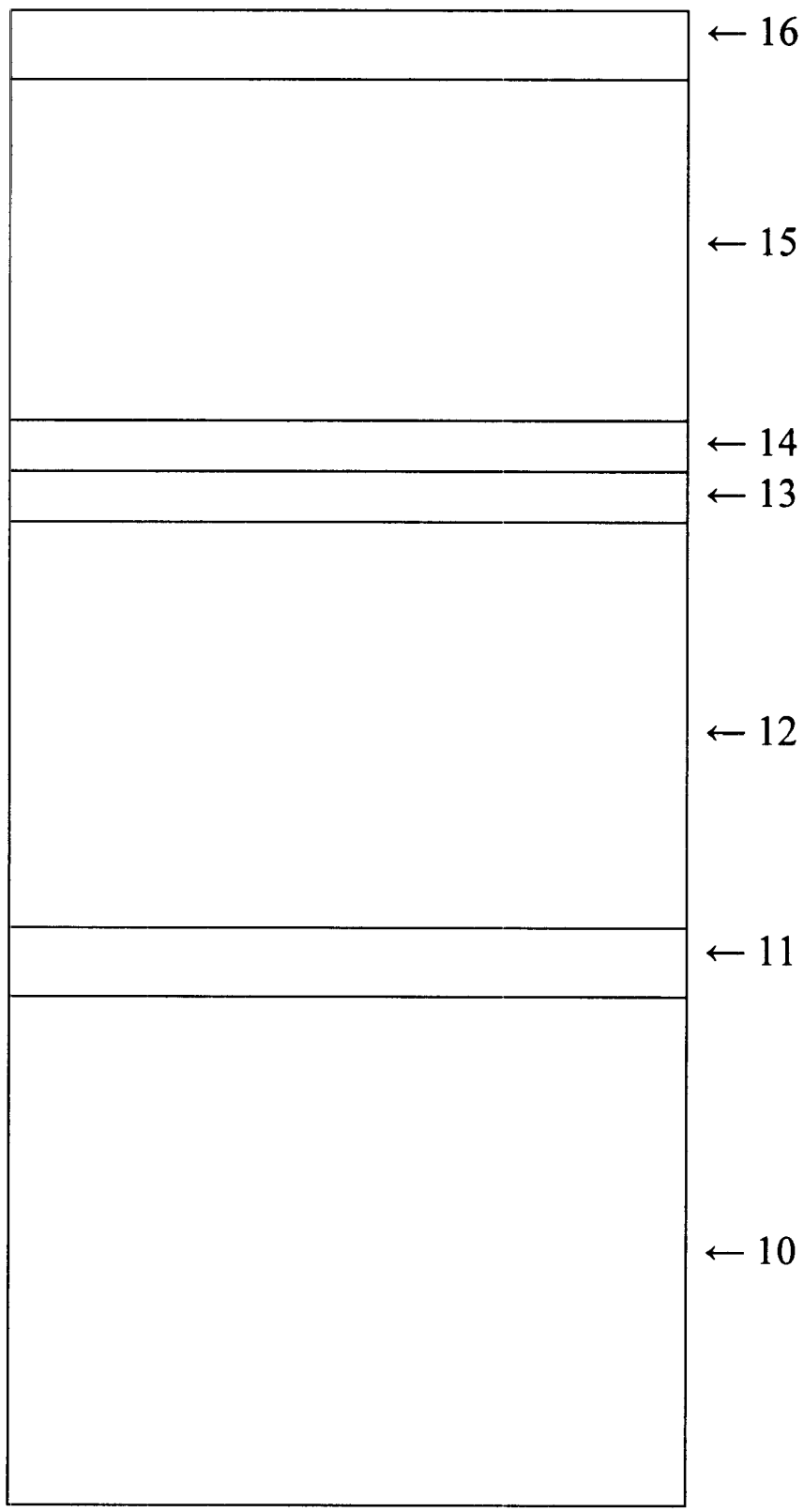
FIG. 1 schematically shows a conventional film structure of a magnetic recording medium.
Figure 2:
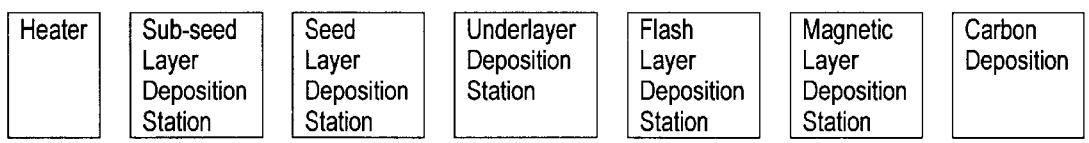
FIG. 2 schematically illustrates a conventional sputtering system.

Conventional techniques for polishing the surface of the non-magnetic substrate of a recording medium use slurry polishing, which requires waste treatment, or use buffing after sputtering.

In accordance with one embodiment of this invention, a method of surface treating a non-magnetic substrate of a magnetic recording medium comprises providing the non-magnetic substrate, applying a moving tape to a surface of the non-magnetic substrate to produce a semi-smooth surface and exposing the semi-smooth surface to photon ozone to produce a smooth surface.

In accordance with one embodiment of this invention, a method of surface treating a non-magnetic substrate of a magnetic recording medium comprises providing the non-magnetic substrate, applying a polishing means for cutting asperity to a surface of the non-magnetic substrate to produce a semi-smooth surface and exposing the semi-smooth surface to photon ozone to produce a smooth surface.

In accordance with one embodiment of this invention, a non-magnetic substrate comprising a smooth surface is formed by a process comprising providing the non-magnetic substrate, applying a moving tape to a surface of the non-magnetic substrate to produce a semi-smooth surface and exposing the semi-smooth surface to photon ozone to produce a smooth surface.

Variations of the above embodiments include embodiments wherein the smooth surface has a $R_{max}$ value of less than 5 nm and a $R_a$ value of less than 1 nm.

In other embodiments, the non-magnetic substrate comprises a textured area, the tape comprises a slurry, and the slurry comprises ceramic particles.

In other embodiments, the smooth surface has a smoothness such that the non-magnetic substrate can be employed for a hard disk drive using a giant magnetoresistive head.

In other embodiments, the semi-smooth surface has a maximum difference in height between the highest and lowest points on the semi-smooth surface relative to a mean plane of less than 10 nm, preferably less than 7 nm, most preferably less than 5 nm or the smooth surface has a maximum difference in height between the highest and lowest points on the smooth surface relative to a mean plane of less than 5 nm, preferably less than 4 nm, most preferably less than 3 nm.

In other embodiments, the moving tape is applied to the surface with a roller forcing the tape to contact the surface or there is an additional wiping process.

This invention uses a surface treatment technique called "ZP" process comprising zap cutting of the surface of the non-magnetic substrate and photon ozone treatment of the surface. Zap cutting is used for cutting the asperity of the surface of the non-magnetic substrate. The zap cutting process could be used before thin film sputter deposition on the surface of the non-magnetic substrate. The method of this invention can be used on a non-magnetic substrate comprising glass, NiP/aluminum, metal alloys, plastic/polymer material, ceramic, glass-ceramic, glass-polymer and other composite materials.

EXAMPLES

All samples described in this disclosure were fabricated with the ZP process using a glass disk substrate. The first step is zap cutting (or called buff/wipe, or called tape burnishing) process. The second step is photon ozone process by using UV light with ozone surrounding the disk. Table 1 shows the effect of surface treatment on the glass disk for GMR media. The surface parameters were measured by atomic force microscope (AFM). The AFM used for this invention has the tradename NanoScope.® The statistics used by the AFM are mostly derived from ASME B46.1 ("Surface Texture: Surface Roughness, Waviness and Law") available from the American Society of Mechanical Engineers, which is incorporated herein by reference.

In particular, the following surface parameters were measured:

(1) Average surface roughness ($R_a$): Arithmetic average of the absolute values of the surface height deviations measured from a mean plane. The value of the mean plane is measured as the average of all the Z values within an enclosed area. The mean can have a negative value because the Z values are measured relative to the Z value when the microscope is engaged. This value is not corrected for tilt in the plane of the data; therefore, plane fitting or flattening the data will change this value.

$$R_a = [|Z_1| + |Z_2| + \ldots + |Z_n|]/N$$

(2) RMS: This is the standard deviation of the Z values within the enclosed area and is calculated as $$RMS = [\{\Sigma(Z_i - Z_{avg})^2\}/N]^{1/2}$$

where $Z_{avg}$ is the average of the Z values within the enclosed area, $Z_i$ is the current Z value, and N is the number of points within the enclosed area. The RMS value is not corrected for tilt in the plane of the data; therefore, plane fitting or flattening the data will change this value.

(3) Maximum height ($R_{max}$): This the difference in height between the highest and lowest points on the surface relative to the mean plane.

(4) $R_z$: This is the average difference in height between five highest peaks and five lowest valleys relative to the mean plane.

All of surface parameters were improved remarkably after the ZP process. The surface roughness average $R_a$ was reduced from 2.197 nm to 0.3 nm. The surface parameter RMS decreased from 4.496 nm to 0.398 nm. The surface parameter $R_{max}$ reduced from 15.557 nm to 2.390 nm. The surface parameter $R_z$ reduced from 8.839 nm to 1.609 nm.

TABLE 1

Surface parameters of glass substrate before and after Zap cutting and Photo-ozone (ZP) Process.

| | $R_a$ (nm) | RMS (nm) | $R_{max}$ (nm) | $R_z$ (nm) |
|---|---|---|---|---|
| As Received Glass | 2.197 | 4.496 | 15.557 | 8.839 |
| Zap cutting (Z Process) to produce a semi-smooth surface | 0.639 | 1.528 | 3.673 | 2.067 |
| Zap cutting Plus Photo-Ozone (ZP Process) to produce a smooth surface | 0.300 | 0.398 | 2.390 | 1.609 |

Figure 3:
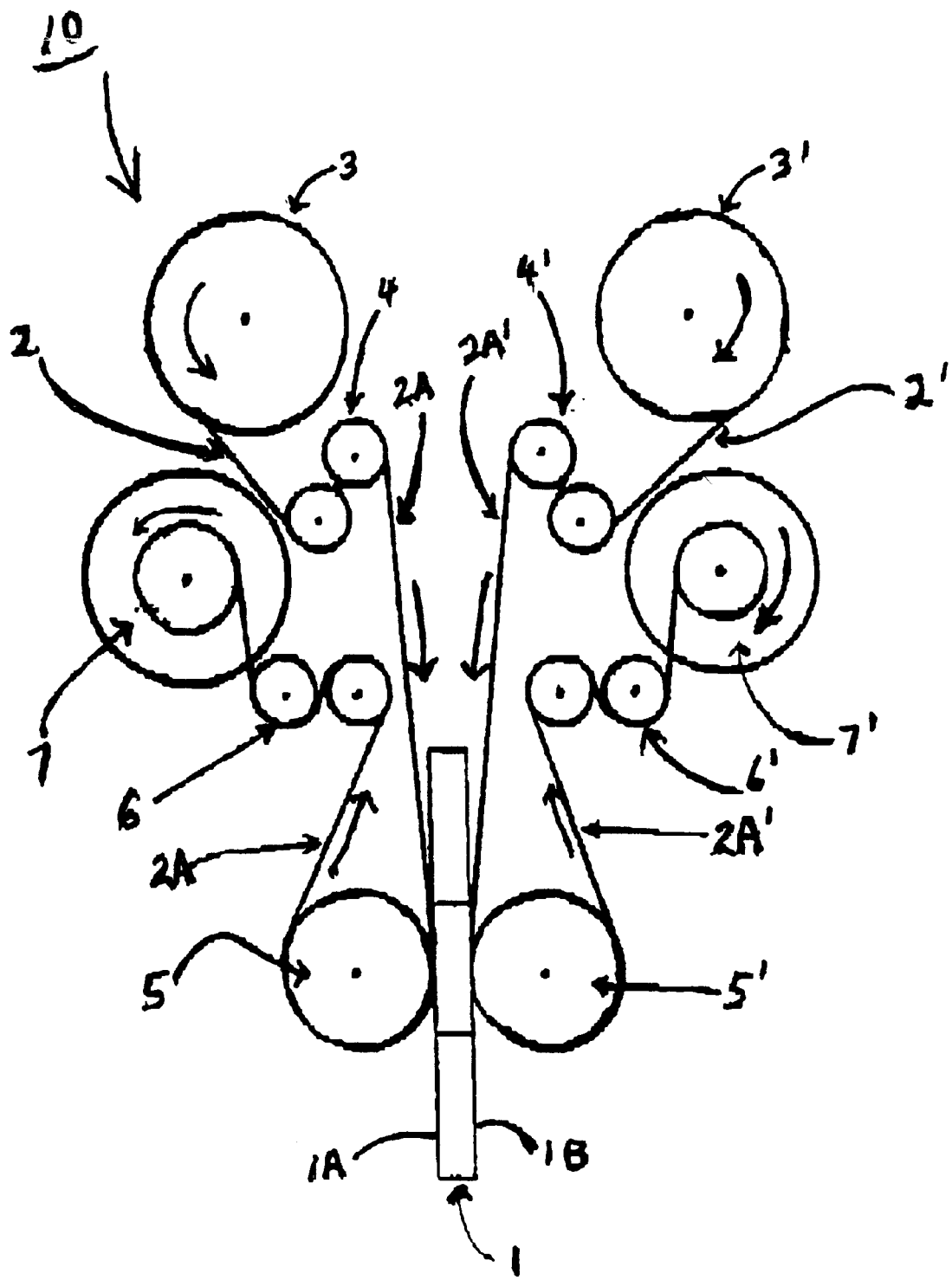
FIG. 3 schematically illustrates a system for zap cutting the substrates of GMR media.

FIG. 3 shows the design of the zap cutting equipment. One of the embodiments of this invention applies contact force on the both sides of disks with roller forcing the tape on the disk with short-term contact. The tape had 0.3 micron alumina slurry on the polyester material. The ceramic slurry was used to cut the asperity of disk surface. The contact force on the disk was 0.8 lb. measured by force gage. The spindle rotation speed of disk was 600 rpm. The tape moving speed was 8 inch per minute. The contact time was three seconds and rest for one second. Then, the contact process was repeated three times. After zap cutting, a wiping process was carried out with a woven fabric polyester material. The wiping time was three second with two pulses with disk rotation speed at 400 rpm and tape speed of 4 inch per minute. The wiping process gave clean surface before AFM measurement.

Referring to FIG. 3, shown therein in simplified, cross-sectional schematic view is an illustrative, but not limiting, embodiment of an apparatus 10 adapted for polishing (burnishing) simultaneously on both major surfaces 1A, 1B of a disk-shaped GMR substrate 1 to produce semi-smooth surfaces. The substrate rotates (by means not shown in the drawing for illustrative simplicity) about a central axis perpendicular to the major surfaces 1A, 1B. Moving tapes 2, 2', the respective outer surfaces 2A, 2A' of which are coated with very finely-dimensioned (e.g., 0.3 μm diameter) abrasive particles (e.g., of alumina $Al_2O_3$), are fed from supply rolls or spools 3, 3' via cooperating pairs of guide/idler rollers 4, 4' to be urged against the respective rotating substrate surfaces 1A, 1B with a desired contact force by means of roller drums 5, 5' which are controllably normally loaded (by means not shown for illustrative simplicity) against the substrate surfaces. Following abrasive contact of substrate surfaces 1A, 1B with respective outer tape surfaces 2A, 2A', tapes 2, 2' are fed, via respective pairs of cooperating guide/idler rollers 6, 6' to respective take-up spools or drums 7, 7'. The rotational speed of the substrate 1, the advancement velocity of the tape 2 and the normal load force against the substrate 1 can be varied, for example, with different substrate materials and different asperities of the starting substrate blank material. In addition, the size and nature of the abrasive particles can be selected for use in a particular application.

Apparatus identical or similar to apparatus 10 described above can be utilized for the tape wiping phase or sub-step of the first, tape burnishing step of the inventive method by replacement of abrasive coated tapes 2, 2' with non-abrasive tapes. The operating parameters such as the substrate rotation speed, the tape advancement velocity, and the normal load force during the tape-wiping phase can be essentially the same or different from that used for burnishing the substrate to prepare the semi-smooth surface. In any event, the tape-wiping step can be optimized for use in a particular application.

Figure 4:
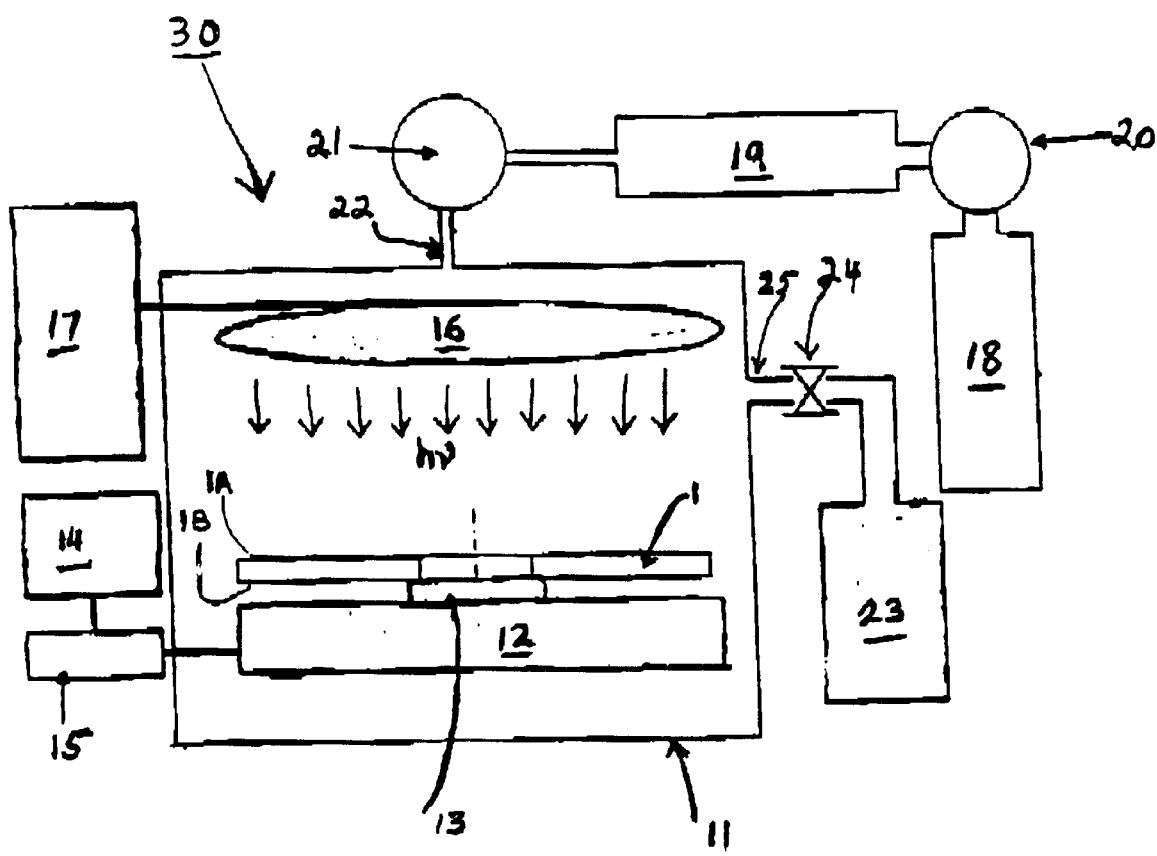
FIG. 4 schematically illustrates a system for photon-ozone treatment of a substrate.

FIG. 4 is the design of the photon-ozone equipment. Oxygen gas with 99.9% purity was used to generate ozone. UV light was used to produce photon treatment with a combination of ozone to strip all of organic, hydrocarbon, moisture, and inorganic debris on the disk surface. The process time was three minutes and 30 seconds. After the photon-ozone process, the system was purged with pure nitrogen before opening the chamber.

Referring to FIG. 4, shown therein in simplified, cross-sectional schematic view, is an illustrative, but not limiting, embodiment of an apparatus 30 utilized for performing the second, photon ozone treatment step of the tape burnished/wiped substrate surface(s) 1A, 1B, according to the inventive methodology. As illustrated, photon ozone treatment apparatus 30 comprises chamber 11 having at its lower end an electrically heatable plate 12 including on its upper surface a substrate holder 13 for rotatably mounting disk substrate 1 thereof such that the lower surface thereon (i.e., 1B) is spaced a distance above plate 12 for allowing the latter to be freely in contact with any gas atmosphere present in chamber 11. Power supply 14 and associated temperature controller 15 are electrically connected to heatable plate 12 for controllable regulating the temperature of substrate 1. A source 16 of ultra-violet (UV) radiation, e.g., a high pressure Hg lamp, is positioned at the upper end of chamber 11, facing the upper surface 1A of substrate 1, and is electrically energized via power supply 17. A source 18 of high purity (e.g., 99.9% pure) oxygen ($O_2$) gas is fluidly connected to an ozone ($O_3$) generator 19 (e.g., of conventional electrostatic type) via pressure regulator 20, and ozone generated therein is supplied to the interior of photon ozone treatment chamber 11 via mass flow controller 21 and gas inlet conduit 22. A source 23 of inert gas, e.g., nitrogen ($N_2$) is fluidly connected to chamber 11 for selectively controllable supply thereto via valve 24 and gas inlet conduit 25.

In operation, a disk-shaped substrate 1 is installed on rotatable mount 13 and power supply 14 with temperature controller 15 is energized to heat the substrate to a predetermined temperature. Ozone gas supplied to photon ozone treatment chamber 11 from generator 19 is photochemically activated by UV photons HV supplied from UV radiation source 16. The mass flow rate of ozone as well as the UV flux intensity are not especially critical; however, each should be sufficient as to yield an economically viable product throughout consistent with the requirements of automated mass production technology. While not desiring to be bound by any particular theory, it is believed that oxygen-containing radicals generated by UV-induced photochemical decomposition of ozone ($O_3$) molecules act to clean the abrasively polished surface 1A, 1B of disk substrate 1, thereby removing contaminants and debris therefrom. An inert gas, e.g., nitrogen, is supplied to chamber 11 for an interval after photon ozone treatment in order to purge any remaining traces of reactive, e.g., oxidizing, species prior to removal of the photon ozone treated substrate 1 therefrom, for deposition thereon of the various layers constituting the recording medium. The combination of tape burnishing/wiping and photon ozone treatment, for reasons which are not fully understood, yields a synergistic reduction is substrate surface asperity and roughness, as is evident from the following illustrative, but not limiting, Examples and FIG. 5, thereby providing substrates with polished surfaces ideally suited for the manufacture of very low glide height GMR media.

Figure 5:
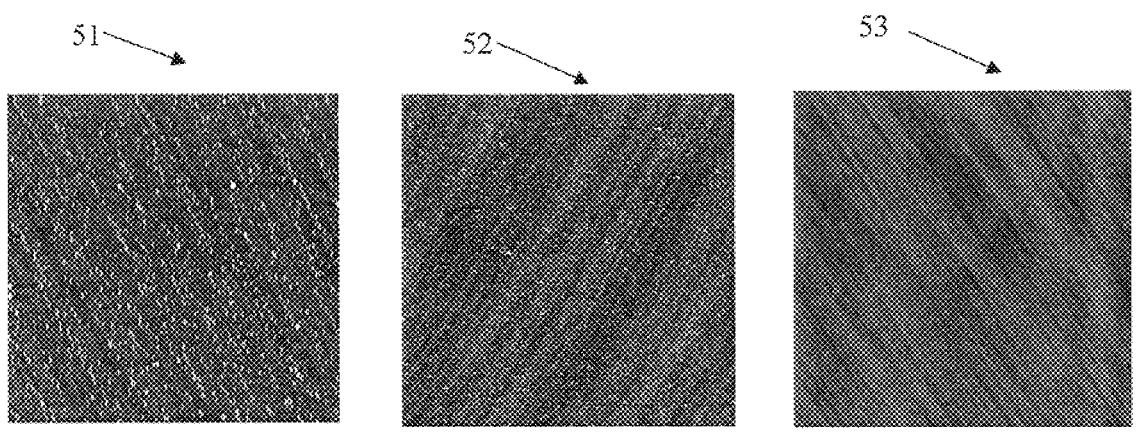
FIG. 5 schematically illustrates the surface finish observed by an atomic force microscope of a glass substrate as received, after zap cutting, and after zap cutting and photon ozone treatment.

FIG. 5 shows the surface finish measured by an atomic force microscope of a glass substrate as-received (51); after zap cutting (52); and after zap cutting and photon ozone treatment (53).

Figure 6:
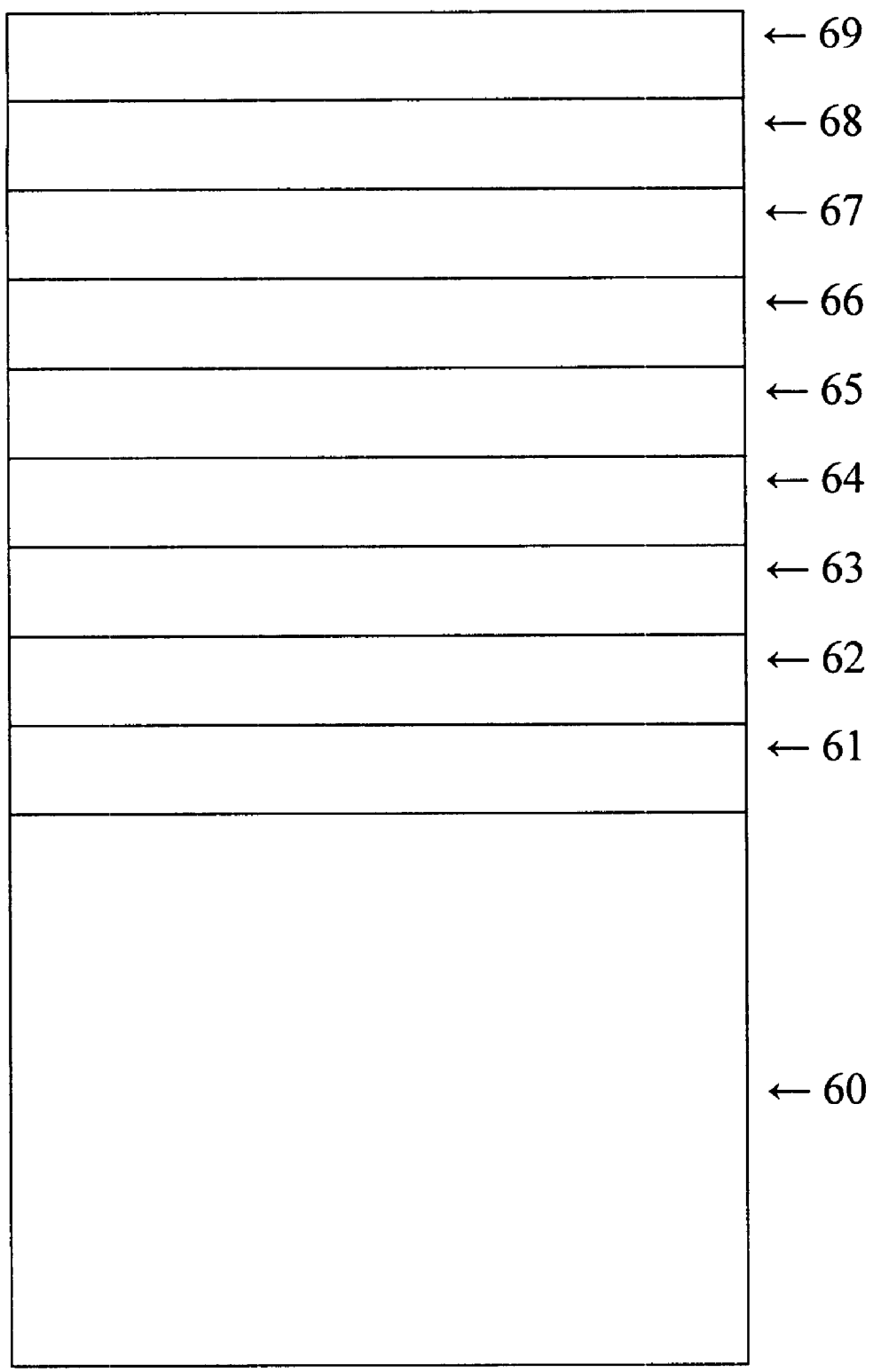
FIG. 6 schematically illustrates the media layer structures of a GMR recording medium.

FIG. 6 shows the configuration of giant magneto-resistance (GMR) media design. This design has the capability to simultaneously improve the magnetic, mechanical and tribological performances of the media. The substrate (60) could be glass, ceramic, glass-ceramic. glass-polymer, NiP/aluminum metal alloys, plastic/polymer material, and other composite materials. Multilayer thin films were double-sided coated on both sides of substrates. The first layer (61) is a seed-layer as well as an adhesion layer, which has strong adhesive force on the substrate without delamination. The material is NiAl, NiP, Cr, NiCr, or NiAlOx etc. The second layer (62) is an oxidation layer or a diffusion barrier layer. This layer has multiple functions for corrosion resistance, passivation and as ion diffusion and/or thermal diffusion barriers. The third layer (63) is an underlayer, e.g. CrMo, CrW, CrV, or Cr-alloy materials. The fourth layer (64) is a nonmagnetic CoCr, or CoCrX layer, where X is a metallic element, that is formed on the foundation as the exchange-decoupling layer because the Cr richer composition is segregated in the grain boundary of CoCr alloys. The fifth layer (65) is a flashlayer with a thickness of about 5 to 25 Å. The material is CoCrPtTa, CoCrPtB, CoCrPtTaNb, or CoCrPtXY, etc., where X and Y are metallic elements. Preferably, X includes Ta, Ni, Mo, Nb, W and V, and Y includes B, C, and N. The sixth layer (66) is a magnetic layer for GMR media, which can be read, erased, and written by the GMR head. The material is CoCrPtTa, CoCrPtB, CoCrPtTaNb, or CoCrPtXY, etc., where X and Y are metallic elements. Preferably, X includes Ta, Ni, Mo, Nb, W and V, and Y includes B, C, and N. The seventh layer (67) is a foundation layer for overcoat but has corrosion resistance, dielectric properties, and very high Young's modulus. The material is SiNx, SiOx, AlNx, or AlOx and the thickness is about 5 to 25 Å. The eighth layer (68) is a carbon overcoat layer either by sputtering, PECVD, or ion beam deposition. The material is CNx, CHx, or CNxHy. The ninth layer (69) is a lubrication layer with a PFPE material. The lube material is MMW Z-Dol, HMW Z-Dol, AM2001, TX or Z-Tetraol. As a result of these layers, this design has improved magnetic, mechanical and tribological performances.

It is important to note that if $R_a<0.3$ nm, the fly height can be less than 0.5 microinch, and with fly height less than 0.5 microinch, areal recording density can be as high as 400 Gb/in². Thus, the inventive methodology provides a simple, convenient, and rapid process for use in very low glide height, very high recording density media, i.e., as high as 400 Gb/in², more preferably, more than 100 Gb/in², and most preferably more than 50 Gb/in². The roughness of the smooth surface of the non-magnetic substrate is low enough such that topographical features of the surface are not replicated in the various media layers deposited thereover, including the layers proximate the flying head.

In other embodiments of this invention the variations in polishing the surface and the polishing means that can employed are any one or more of the methods shown below.

Mechanical Polishing

Persons skilled in this art would recognize that the variables that control mechanical polishing are:
(1) substrate surface initial condition: roughness, waviness, substrate size, substrate shape and grain size;
(2) polishing slurry size($Al_2O_3$, $CeO_2$, $SiO_2$, etc) and coolant (inorganic and organic solutions with lubricant);
(3) polishing time and surface finishing; and
(4) washing and cleaning substrate surface Chemical Polishing Persons skilled in this art would recognize that the variables that control chemical polishing are:
(1) substrate surface initial condition: roughness, waviness, substrate size, substrate shape and grain size;
(2) polishing solutions compositions and their ability to dissolve the substrate materials;
(3) the composition consists of a combination of different acids (e.g. nitric, sulfuric, hydrochloric, phosphoric, chromic, acetic) or organic solutions (e.g. methanol, glycerin, ethyldiglicol), also containing some added electropositive ions. E.g., polishing of Al: small amounts of Cu will create additional local cathodes by deposition on Al, stimulating the polishing process. Adding some oxidants has a function as depolarization agents.

Electrochemical Polishing

Persons skilled in this art would recognize that the variables that control electrochemical polishing are:
(1) The external source of electricity to produce the anodic current density and voltage;
(2) the electrolyte temperature;
(3) the time duration of electropolishing;
(4) the cathodic materials; in general, the cathode surface should be many times larger than that of electropolished substrate. Different materials are used as cathodes depending on the applied electrolyte; and
(5) agitation, which can eliminates the undesired concentration of the dissolved material at the substrate. Agitation can improve the supply of fresh electropolishing electrolyte to substrate surface. Agitation can prevent local heating and release gas bubbles from the polished surface to avoid pitting on the substrate surface.

CMP (Chemical Mechanical Polishing) used in semiconductor wafer polishing. Persons skilled in this art would recognize that the variables that control the CMP process.

In other embodiments, the semi-smooth surface has a $R_a$ value of less than 2 nm, preferably less than 1 nm, most preferably less than 0.5 nm or the smooth surface has a $R_a$ value of less than 1 nm, preferably less than 0.5 nm, most preferably less than 0.25 nm.

In other embodiments, the semi-smooth surface has a RMS value of less than 5 nm, preferably less than 2 nm, most preferably less than 1 nm or the smooth surface has a RMS value of less than 2 nm, preferably less than 1 nm, most preferably less than 0.5 nm.

In other embodiments, the semi-smooth surface has a $R_z$ value of less than 5 nm, preferably less than 2 nm, most preferably less than 1 nm or the smooth surface has a $R_z$ value of less than 2 nm, preferably less than 1 nm, most preferably less than 0.5nm.

These surface treatment techniques with the ZP processes of this invention give clean substrate surface for lower glide with zero hard hits. They also produce super-clean and defect-free surface for ultra high-density GMR media. The recording media produced by zap cutting and photon ozone treatment are suitable for high-density magnetic recording.

This invention could be used for disk drives using load/unload mechanism, which require the surface roughness to be smooth throughout the whole disk surface. For the disk drives that require CSS test, the surface roughness is generally higher (to avoid stiction) on the laser textured landing zone area than on the data zone area. However, the whole disk can be polished to a very smooth finish using this invention before laser texturing the landing zone.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

What is claimed is:

1. A method of surface treating a non-magnetic substrate of a magnetic recording medium, comprising:
   providing the non-magnetic substrate,
   applying a moving tape to a surface of the non-magnetic substrate to produce a first surface and
   exposing the first surface to ozone produced by activating oxygen by photons to produce a second surface.

2. The method of surface treating a non-magnetic substrate according to claim 1, wherein the smooth surface has a $R_{max}$ value of less than 5 nm and a $R_a$ value of less than 1 nm.

3. The method of surface treating a non-magnetic substrate according to claim 1, wherein the tape comprises a slurry.

4. The method of surface treating a non-magnetic substrate according to claim 1, wherein the second surface has a smoothness such that the non-magnetic substrate can be employed for a hard disk drive using a giant magnetoresistive head.

5. The method of surface treating a non-magnetic substrate according to claim 1, wherein the first surface has a maximum difference in height between the highest and lowest points on the first surface relative to a mean plane of less than 10 nm.

6. The method of surface treating a non-magnetic substrate according to claim 1, wherein the second surface has a maximum difference in height between the highest and lowest points on the second surface relative to a mean plane of less than 5 nm.

7. The method of surface treating a non-magnetic substrate according to claim 1, wherein the moving tape is applied to the surface with a roller forcing the tape to contact the surface.

8. The method of surface treating a non-magnetic substrate according to claim 1, further comprising a wiping process.

9. A method of surface treating a non-magnetic substrate of a magnetic recording medium, comprising:

providing the non-magnetic substrate, polishing a surface of the non-magnetic substrate to produce a first surface and exposing the first surface to ozone produced by activating oxygen by photons to produce a second surface.

10. The method of surface treating a non-magnetic substrate according to claim 9, wherein the second surface has a $R_{max}$ value of less than 5 nm and a $R_a$ value of less than 1 nm.

11. The method of surface treating a non-magnetic substrate according to claim 9, wherein the polishing means comprises a slurry.

12. The method of surface treating a non-magnetic substrate according to claim 9, wherein the second surface has a smoothness such that the non-magnetic substrate can be employed for a hard disk drive using a giant magnetoresistive head.

13. The method of surface treating a non-magnetic substrate according to claim 9, wherein the first surface has a maximum difference in height between the highest and lowest points on the first surface relative to a mean plane of less than 10 nm.

14. The method of surface treating a non-magnetic substrate according to claim 9, wherein the second surface has a maximum difference in height between the highest and lowest points on the second surface relative to a mean plane of less than 5 nm.

15. The method of surface treating a non-magnetic substrate according to claim 9, further comprising a wiping process.

* * * * *